United States Patent [19]
Satzler

[11] Patent Number: 5,947,818
[45] Date of Patent: Sep. 7, 1999

[54] DRIVE SYSTEM FOR A COMBINE WITH A ROTARY THRESHING SYSTEM

[75] Inventor: Ronnie L. Satzler, Princeville, Ill.

[73] Assignee: Caterpillar Inc., Peoria, Ill.

[21] Appl. No.: 08/988,627

[22] Filed: Dec. 10, 1997

[51] Int. Cl.$^6$ ............................................. A01F 12/00
[52] U.S. Cl. ......................... 460/6; 460/116; 56/10.2 G
[58] Field of Search ................... 460/116, 6, 1, 460/119, 150; 56/10.2 G, 10.2 H, DIG. 15

[56] References Cited

U.S. PATENT DOCUMENTS

| | | | |
|---|---|---|---|
| 3,863,643 | 2/1975 | DePauw . | |
| 3,982,549 | 9/1976 | DePauw et al. . | |
| 4,160,456 | 7/1979 | Hawkins et al. . | |
| 4,248,249 | 2/1981 | Dunn et al. . | |
| 4,422,462 | 12/1983 | Decoene | 460/116 X |
| 4,458,471 | 7/1984 | Herwig | 460/6 X |
| 4,986,794 | 1/1991 | Ricketts | 460/67 |
| 5,855,108 | 1/1999 | Salz et al. | 56/10.2 G |

*Primary Examiner*—Terry Lee Melius
*Attorney, Agent, or Firm*—J. W. Burrows

[57] ABSTRACT

An infinitely variable drive system is provided for a rotor assembly of a rotating threshing system of a harvesting machine, such as a combine, having other work system requiring a substantially constant speed. The drive system includes an engine having constant horsepower over a predetermined speed range, a multi-speed transmission and an infinitely variable transmission connected in parallel to the variable speed engine. The rotor being driven by the multi-speed transmission and the other work systems being driven by the infinitely variable transmission. The change in speed of the rotor assembly is controlled by the variable speed engine and the constant speed to the other work systems is controlled by the infinitely variable transmission. The infinitely variable transmission operates in response to a change in speed of the variable speed engine to add or subtract speed thereto to maintain a substantially constant output speed therefrom.

7 Claims, 3 Drawing Sheets

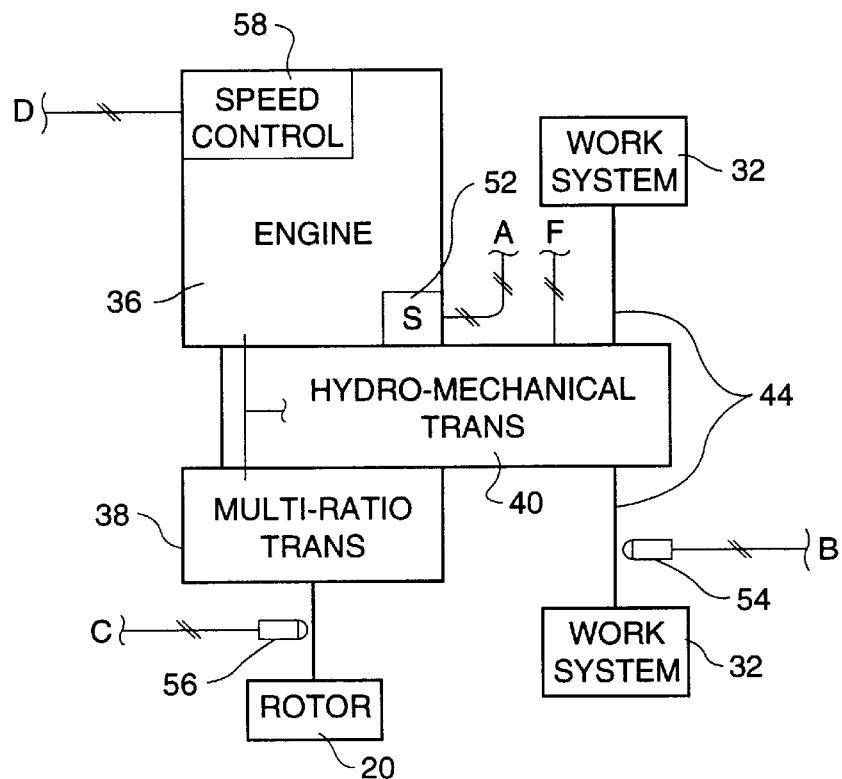
Fig-2-
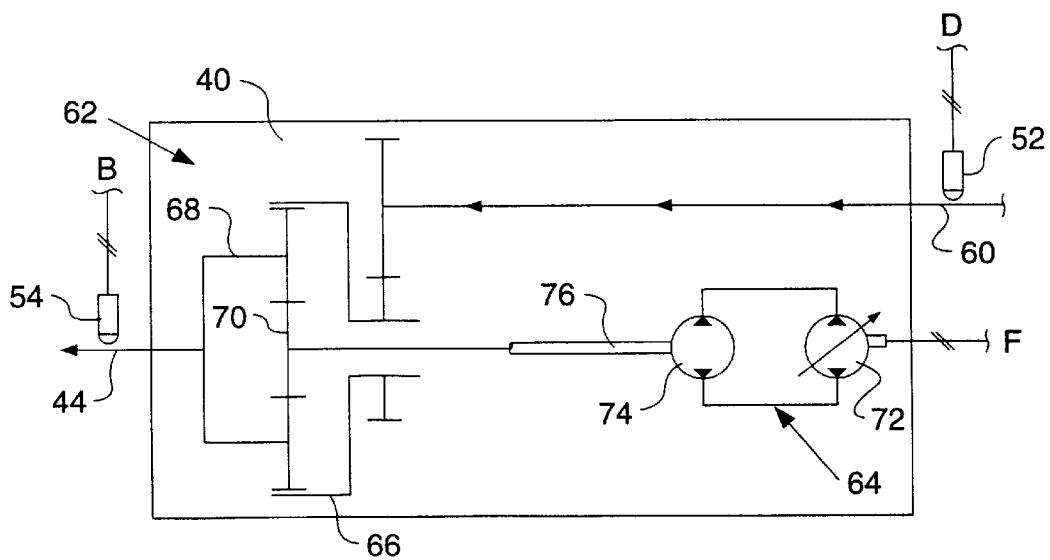
Fig-3-

Fig-4

| ROTOR SPEED RANGE (RPM) | ROTOR DRIVE RATIO | ENGINE SPEED RANGE (RPM) | HYDRO-MECHANICAL TRANSMISSION OUTPUT SPEED |
|---|---|---|---|
| 400 → 533 | 4.50:1 | 1800 → 2400 | 2100 |
| 490 → 654 | 3.67:1 | 1800 → 2400 | 2100 |
| 600 → 800 | 3.00:1 | 1800 → 2400 | 2100 |
| 735 → 980 | 2.45:1 | 1800 → 2400 | 2100 |
| 900 → 1200 | 2.00:1 | 1800 → 2400 | 2100 |

DRIVE SYSTEM FOR A COMBINE WITH A ROTARY THRESHING SYSTEM

TECHNICAL FIELD

This invention relates generally to a drive system for a harvesting machine such as a combine with a rotating threshing system and more particularly to a combine having a substantially infinitely variable speed for the rotor of the rotating threshing system.

BACKGROUND ART

Combines having rotating concave threshing systems are known in the art. These types of combines utilize a rotating rotor assembly positioned within a rotating concave assembly. Since combines encounter wide ranges of harvesting situations and crops, it is important to provide a harvesting mechanism that collects the crop in the minimum amount of time with the least losses and product damage. It has been determined that feed rate into the threshing mechanism is a very important factor affecting grain losses and/or damage. Grain losses increase as the feed rate increases. Many times these losses are due to overloading of materials entering the threshing mechanism which results in stalls and/or clogging. The rotating concave threshing system has proved helpful in overcoming these problems to some extent.

Some known threshing systems have used multi-ratio gear type transmissions to drive the rotor assembly with several distinct ratios between the engine speed and rotor assembly speed. Other threshing systems have used bulky, complex, infinitely variable drive systems. It is desirable to have an inexpensive infinitely variable drive speed for the rotor assembly relative to the engine while maintaining constant engine speed for other machine functions.

The present invention is directed to overcome one or more of the problems as set forth above.

DISCLOSURE OF THE INVENTION

In one aspect of the present invention, an infinitely variable drive system is provided for a rotor assembly of a rotating threshing system of a harvesting machine having other work systems requiring a substantially constant drive speed. The drive system includes a variable speed engine having full horsepower over a predetermined speed range. The system includes a multi-ratio transmission connected to the variable speed engine and operative to drive the rotor assembly over a plurality of different speed ratios. An infinitely variable transmission is provided and connected to the variable speed engine in parallel with the multi-ratio transmission and operative to maintain a substantially constant output speed therefrom to the other work systems over the entire variable speed range of the engine.

BRIEF DESCRIPTION OF THE DRAWINGS

FIG. 2 is a diagrammatic representation of a drive system for the concave threshing system;

FIG. 3 is a more detailed diagrammatic representation of a portion of the drive system of FIG. 2; and FIG. 4 is a table illustrating the speed ranges of various portions of the combine during operation.

BEST MODE FOR CARRYING OUT THE INVENTION

Figure 1:
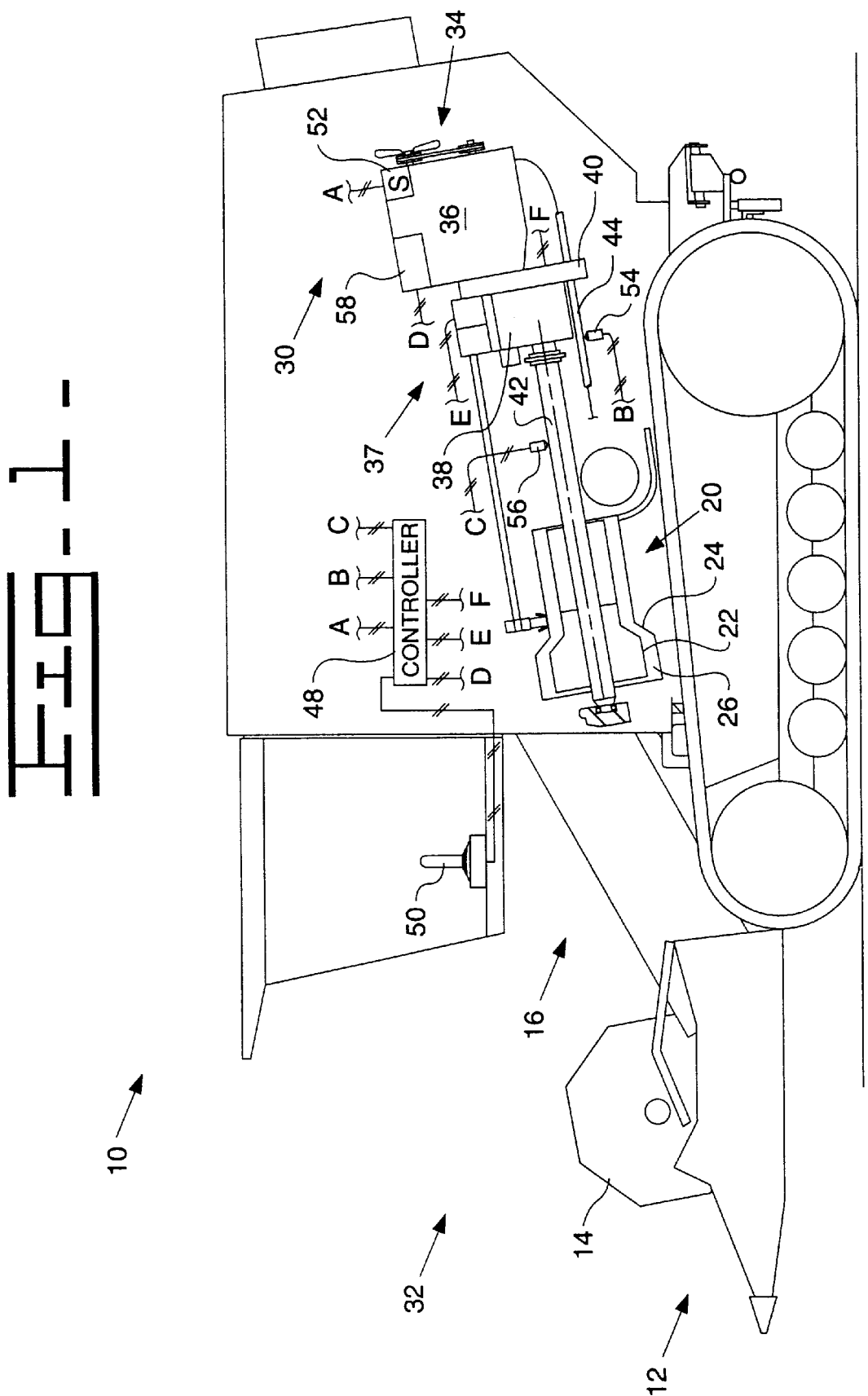
FIG. 1 is a diagrammatic side elevational view of a combine having a rotating concave threshing system incorporating the subject invention.

Referring to the drawings and more particularly to FIGS. 1 and 2, a harvesting machine 10, such as a combine, is illustrated and includes a header 12 for receiving the cut materials, an auger system 14 for moving the material into a feederhouse 16 and subsequently into a rotating threshing system 20.

The rotating threshing system 20 includes a rotor assembly 22 positioned within a concave assembly 24. The cut material passes from the feederhouse 16 into an annulus 26 defined between the rotor assembly 22 and the concave assembly 24. The concave assembly 24 may be turning in an opposite direction to the rotation of the rotor assembly 22 or may be turning in the same direction a different speed.

The harvesting machine 10 includes a drive system 30 and other work systems 32. The other work systems 32 include systems, such as, a drive for a cooling fan 34, the header 12, and/or the feederhouse 16. The other work systems 32 each requires a substantially constant drive speed while the speed of the drive system 30 is varied.

The drive system 30 includes a variable speed engine 36, a multi-ratio transmission 38 connected to the engine 36, a fluid drive 37, and an infinitely variable transmission, such as a hydro-mechanical transmission 40, that is connected to the engine 36 in parallel with the multi-ratio transmission 38. The variable speed engine 36 is operative to maintain full horsepower over a predetermined speed range.

The multi-ratio transmission 38, as is well known, has a plurality of speed ratios and in the subject embodiment it has five speed ratios. It is recognized that different numbers of gear ratios may be used. The multi-ratio transmission 38 is drivingly connected to the rotor assembly 22 by a shaft 42 and the fluid drive 37 is drivingly connected to the concave assembly 24.

The hydro-mechanical transmission 40 delivers power to the other work systems 32 through the output shaft 44 and is illustrated in greater detail hereinafter in FIG. 3.

An electronic controller 48 is provided and receives an operator's input signal from an operator input control 50, an engine speed sensor 52, a speed sensor 54 associated with the output shaft 44 leading to the other work systems 32, and a speed sensor 56 associated with the shaft 42 leading to the rotor assembly 22. The operator input control 50 is operative to control the speed of the engine 36 and the speed of the rotor assembly 20. The electronic controller 48 directs command signals to a speed controller 58 of the engine 36, the fluid drive 37, and the hydro-mechanical transmission 40.

Referring to FIG. 3, the hydro-mechanical transmission 40 is illustrated in greater detail. The hydro-mechanical transmission 40 receives power from the engine 36 through an input shaft 60 and the power is delivered therefrom to the other work systems 32 through the output shaft 44. The hydro-mechanical transmission 40 includes a planetary gear set 62 and a hydrostatic drive unit 64.

The planetary gear set 62 includes a ring gear 66, connected to the input shaft 60 leading from the engine 36, a planet gear set 68 connected to the output shaft 44 and a sun gear 70 connected to the output of the hydrostatic drive unit 64.

The hydrostatic drive unit 64 includes a variable displacement pump 72 that is driven by the engine 36 and fluidity connected to a fixed displacement motor 74. The fixed displacement motor 74 has an output shaft 76 connected to the sun gear 70. The displacement of the variable displacement pump 72 is controlled in response to receipt of one of the command signals from the electronic controller 48.

Referring to FIG. 4, a table is illustrated and indicates, as one example, the range of speed of the rotor assembly 22 in each of the five ratios of the multi-ratio transmission 38 as the speed of the engine 36 is being varied over its predetermined speed range. As also indicated by the table of FIG. 4, the output speed from the hydro-mechanical transmission 40 is maintained at a substantially fixed speed. Also, it is noted that there is an overlap in speeds between adjacent ratios of the multi-ratio transmission 38.

It is recognized that various arrangements of the subject drive system 30 could be used without departing from the essence of the subject invention. For example, the ratios and speed ranges set forth in FIG. 4 could be changed for different machines. As is well known, a slower rotational speed of the rotor assembly 20 is desirable for large grain, such as corn and soybeans. When harvesting grains, such as wheat, flax, milo and oats, it is desirable to increase the rotational speed of the rotor assembly 20. Additionally, when harvesting even smaller grain such as rape, grass and clover, it is desirable to further increase the rotational speed of the rotor assembly 20.

Industrial Applicability

During the operation of the subject harvesting machine 10, the material being harvested is cut and delivered to the annulus 26 of the rotating threshing mechanism 20 in a conventional manner. Depending on the size of the grain being harvested, the operator adjusts the speed of the rotor assembly 22. This is accomplished by the operator making an input to the input control 50. The electronic controller 48 receives the input command from the input control 50 and directs respective command signals to the engine speed controller 58 and the variable displacement pump 72 of the hydrostatic drive unit 64. The speed sensor 42 provides a feedback to the electronic controller 48 to ensure that the desired speed of the rotor assembly 22 is maintained. If it is not correct, the command signal to the engine speed controller 58 is adjusted accordingly. The speed sensor 54 provides a speed feedback to the electronic controller 48 of the speed of the output shaft 44 to the other work systems 32. If the speed of the output shaft is not at its desired constant speed, the electronic controller 48 adjusts the command signal to the variable displacement pump 72 to accordingly change the speed of the motor 74 to thereby change the speed of the sun gear 70.

If, for example, large grain is being harvested, the operator may set the desired speed of the rotor assembly 22 at 500 rpm. The electronic controller 48 would place the multi-ratio transmission 38 in its first speed ratio and set the engine speed at approximately 2240 rpms. At the same time, the electronic controller 48 directs a command signal to the variable displacement pump 72 changing its displacement to produce a given volume of fluid, in a given direction to the motor 74. The motor 74 turns the sun gear 70 at a predetermined speed and in a direction that would effectively subtract 140 rpms from the speed of the input shaft 60 and deliver 2100 rpm to the output shaft 44 that is driving the other work systems 32.

If the condition of the grain being harvested changes due to moisture content or yield quantity or other factors such as high concentrations of weeds, etc., it may require the speed of the rotor assembly 22 to be changed. The operator c/an easily change the speed of the rotor assembly 22 by moving the input control 50. In response to movement of the input control 50 to decrease the speed of the rotor assembly, the electronic controller 48 directs a signal to the engine speed controller 58 to decrease the speed of the engine 36. If the engine speed has been reduced to, for example, 1900 rpm, the speed of the rotor assembly 22 is reduced to approximately 425 rpm. At the same time, the electronic controller 48 directs a command signal to the variable displacement pump 72. The pump 72 changes displacement to drive the motor 74 in a direction and speed to turn the sun gear 70 at a speed and direction to effectively add 200 rpm to the speed of the input shaft 60 so that the output shaft 44 is turning at the rate of 2100 rpm.

Likewise, if the harvesting machine 10 is harvesting smaller grain, the operator moves the input control 50 accordingly and the electronic controller 48 directs appropriate command signals to change the ratio of the multi-ratio transmission 38, to adjust the speed of the engine 36, and to adjust the displacement of the hydrostatic drive unit 64 to match the desired input. As noted with respect to the table of FIG. 4, the speed of the output shaft 44 to the other work systems 32 remains at a substantially constant speed of 2100 rpm while the speed of the rotor assembly 22 is infinitely varied.

In view of the foregoing, it is readily apparent that the subject drive system 30 provides a substantially infinitely variable speed to the rotor assembly 22 of a harvesting machine 10 while maintaining a substantially constant speed to other work systems 32.

Other aspects, objects and advantages of this invention can be obtained from a study of the drawings, the disclosure and the appended claims.

I claim:

1. An infinitely variable drive system for a rotor assembly of a rotating threshing system of a harvesting machine having other work systems requiring a substantially constant drive speed, the drive system comprising:

a variable speed engine having full horsepower over a predetermined speed range;

a multi-ratio transmission connected to the variable speed engine and operative to drive the rotor assembly over a plurality of different speed ratios; and an infinitely variable transmission connected to the variable speed engine in parallel with the multi-ratio transmission and said infinitely variable transmission being operative to maintain a substantially constant output speed therefrom to the other work systems over the entire variable speed range of the engine.

2. The infinitely variable drive system of claim 1 wherein the infinitely variable transmission is a hydro-mechanical transmission that includes an input connected to the variable speed engine, a planetary gear arrangement, an infinitely variable hydrostatic drive unit and an output connected to the work systems requiring a substantially constant speed.

3. The infinitely variable drive system of claim 2 wherein the planetary gear arrangement has a ring gear connected to the input thereof, a planet gear set connected to the output therefrom, and a sun gear connected to an infinitely variable hydrostatic drive unit.

4. The infinitely variable drive system of claim 3 including an electronic controller, an operator input control connected to the electronic controller, a first speed sensor operative to sense and deliver a signal to the electronic controller that is representative of the engine speed, a second speed sensor operative to sense and deliver a signal to the electronic controller that is representative of the output speed of the hydro-mechanical transmission and a third speed sensor operative to sense and deliver a signal to the electronic controller that is representative of the output speed of the multi-ratio transmission, the electronic controller being operative to control the direction and speed of the hydrostatic drive unit in response to the operating speed of the variable speed unit in order to maintain a substantially constant speed to the work systems requiring a substantially constant speed.

5. The infinitely variable drive system of claim 4 wherein the change in speed of the rotor assembly in each of the gear ratios is controlled by varying the speed of the variable speed engine.

6. The infinitely variable drive system of claim 5 wherein the speed range of the rotor assembly in one gear ratio overlaps with the speed range of the rotor assembly in an adjacent gear ratio.

7. The infinitely variable drive system of claim 6 wherein the multi-ratio transmission has five different speed ratios.

* * * * *